F. J. FOX.

Assignor to J. M. Robinson & W. Z. Blakslee.

CASING SPEAR.

No. 7,675. Reissued May 15, 1877.

WITNESSES:

W. W. Hollingsworth

Edw. C. Byrn

INVENTOR:

Francis J. Fox

BY

ATTORNEYS.

UNITED STATES PATENT OFFICE.

FRANCIS J. FOX, OF ST. PETERSBURG, PA., ASSIGNOR TO JAMES M. ROBINSON AND WILLIAM Z. BLAKSLEE, OF SAME PLACE.

IMPROVEMENT IN CASING-SPEARS.

Specification forming part of Letters Patent No. 154,135, dated August 18, 1874; reissue No. 7,675, dated May 15, 1877; application filed April 9, 1877.

*To all whom it may concern:*

Be it known that I, FRANCIS J. FOX, of St. Petersburg, in the county of Clarion and State of Pennsylvania, have invented a new and Improved Casing-Spear; and I do hereby declare that the following is a full, clear, and exact description of the same, reference being had to the accompanying drawing, forming part of this specification, in which—

Figure 1:
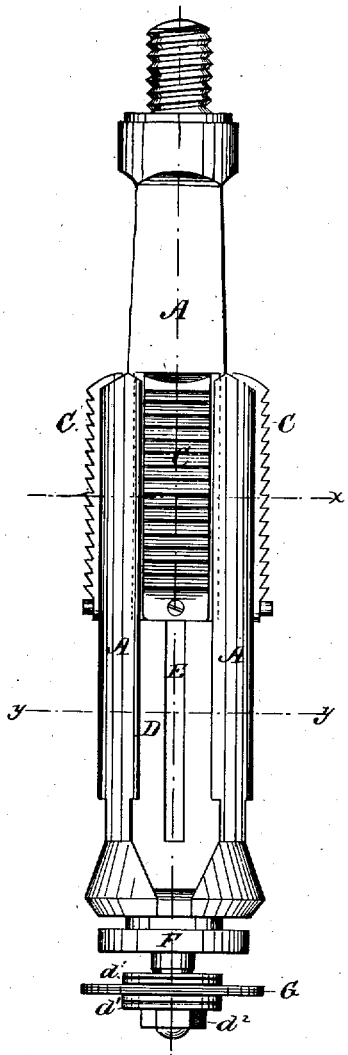
Figure 2:
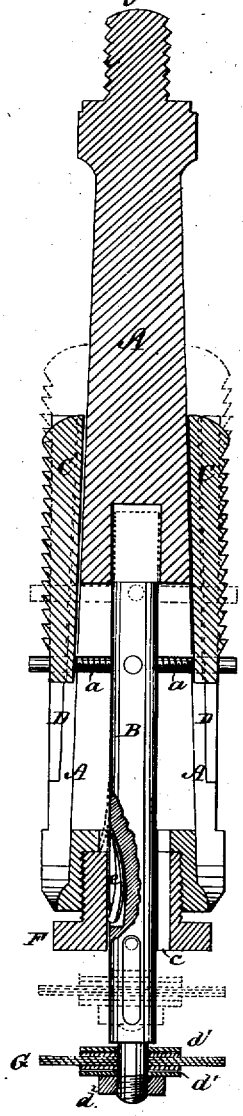
Figure 3:
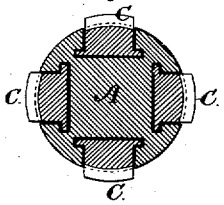
Figure 4:
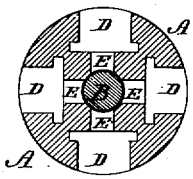
Figure 5:
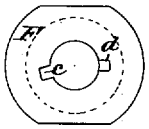
Figure 6:
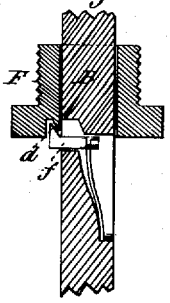

Figure 1 is a side view; Fig. 2, a longitudinal section; Fig. 3, a transverse section through line *x x* of Fig. 1; Fig. 4, a transverse section through line *y y* of Fig. 1. Fig. 5, a detail view of the face of the hollow nut; Fig. 6, a sectional detail of the devices for holding the plunger to the hollow nut while the spear is being inserted.

The object of my invention is to provide an improved construction of casing-spear, or device for removing the sections of the casing or tube from artesian or oil wells, the same being designed to improve the operation of the spear by facilitating the engagement and disengagement of the same with the casing, and to obviate also the loss of the spear, which, when detached, is liable to become wedged into the casing, thus rendering the recovery of the same difficult, and seriously embarrassing the removal of the casing.

My invention consists chiefly in the employment of a frictional device, made preferably in the shape of an elastic disk or washer, which is used in connection with the main stem or case and sliding expansible griping-plates, the said frictional device serving to engage with the sides of the tube or casing, and thus by frictional contact to hold one portion of the spear while the operator works the other to secure the adjustment and expansion of the parts in effecting their engagement or disengagement with the tube or casing to be withdrawn.

The invention also further consists in other features of improvements, hereinafter described and claimed.

In the accompanying drawing, A represents the main stem or case of the spear, the upper squared portion of which is made solid and provided with a screw-threaded connection, while the lower rounded portion of the same is made hollow.

B is a plunger, arranged to slide longitudinally in the hollow portion of the main stem or case, and extending through the bottom end of the same.

C are sliding griping-plates, which are two or more in number, and are provided with external teeth, serrations, or corrugations.

The main stem A is provided with longitudinal undercut or dovetailed grooves D, in which the plates C move, which grooves diverge or incline away from the center toward the lower end of the stem, so that the plates, when slid toward the lower end of the stem, are expanded or projected laterally against the walls of the surrounding well-casing, and are caused to gripe the same with their roughened faces.

In the bottom of the grooves D are formed longitudinal slots E, which extend through to the hollow portion of the stem, and give passage to the screws or pins *a*, which extend radially through the same, and rigidly connect the sliding griping-plates C in the grooves, with the plunger B upon the inside.

F is a hollow nut affixed to the lower end of the main stem so as to turn or swivel, the same, as shown, being formed with an externally screw-threaded sleeve, which, by engaging with a corresponding interior thread in the end of the stem, at the same time affords a connection and permits the nut to swivel. This nut is provided with a longitudinal groove, *c*, upon its inner periphery, and upon its lower face has a notch, *d*.

G is a flexible friction-disk or washer attached to the lower end of the plunger by washers $d^1$ $d^1$ and a nut, $d^2$. This flexible disk is made of a slightly-greater diameter than the spear, and of a size to fit closely the tube or casing of the well, so as to bind with the walls of the same and supply the frictional "hold" that is necessary to permit of the support of the griping-plates, and the independent movement of the stem A between said plates and the plunger.

This independent movement of the two sliding parts, (the stem on the one hand, and the griping-plates and plunger on the other,) which is rendered possible through the contact of the frictional device G with the walls of the tube, is definitely controlled and limited by the spring-catches *e* and *f* located in and moving laterally out of the plunger to engage with the hollow nut F, through which the plunger passes, as will be more fully described in the description of the operation here following:

In making use of my improved casing-spear, the same is designed to operate in connection with a jarring-tool, which is fastened to the upper end of the spear, and through which jarring-tool it connects with a rope. Now, when the spear is inserted into the well-casing, it is in the position shown in Figs. 2 and 6, the griping-plates elevated, but not to their highest position, the spring-catch *e* bearing against the inner periphery of the hollow nut F, and the spring-catch *f* projecting laterally from the plunger, and its tooth in the notch *d* on the face of the hollow nut, which position is maintained during the insertion and passage of the spear down to its proper position, the upward pressure of the plunger from the frictional contact of the flexible disk, and the downward pressure of the stem and hollow nut, from the gravity, or the force of insertion, serving to hold the catch *f* in its notch during the said insertion or downward movement. As soon as the proper position has been reached the stem A is then slightly lifted by means of the rope, which has the effect to disengage catch *f* from its notch *d*, and allow it to recede into the plunger from the action of its spring. During this movement of the stem the plunger remains stationary from the frictional contact of its disk, while the hollow nut rises with the stem, which latter, in its ascent, expands or projects laterally the griping-plates by reason of the diverging grooves of the stem and its greater size at the bottom, which causes the roughened faces of the said plates to bite the walls of the tube or casing and produce a rigid connection therewith, which permits the strain of the windlass or jack-screw above to be imparted to the section of the casing to loosen the same. The jarring-tool is then operated first to "jar up" to loosen the casing, and is afterward "jarred down" to drive back stem A and release the hold of the plates C upon the casing, and as soon as the latter are disengaged therefrom the stem A sinks lower, permitting the plates C (held stationary by friction-disk) to move inwardly into the upper converging portion of the grooves in the stem. At the same time also that the stem A descends, the hollow nut F, which is attached to it, passes down below the end of the catch *e*, which latter rests upon the top of the threaded sleeve of the nut, as shown in Fig. 1 and in dotted lines in Fig. 2, in which position the spear is free from the casing, and may be removed without expanding the griping-plates, the loosened sections of the well-casing being afterward taken out at a second operation with the jarring-tool disconnected.

To set the spear for another insertion, the hollow nut F is turned until catch *e* is in line with the inner groove *c* of the said nut, when the plunger is brought down and the device reset, as in Fig. 6.

Having thus described my invention, what I claim as new is—

1. A casing-spear composed of parts arranged to be expanded by a movement upon each other, and having upon one of said parts a frictional device adapted to bind with the walls of the well-tube or casing, to permit the adjustment necessary to gripe and release the same, as described.

2. A casing-spear having expansible griping-slides, combined with a frictional device adapted to bind with the walls of the well-tube, substantially as described, and for the purpose set forth.

3. A casing-spear composed of parts arranged to be expanded by a movement upon each other, and having upon one of its parts an elastic friction-disk of greater diameter than the spear, for the purpose described.

4. The stem or case A, having inclined grooves D and slots E, in combination with the sliding griping-plates C, and the plunger B, connected with said plates, and carrying upon its end a frictional disk, G, adapted to bind with the well-tube, as and for the purpose described.

5. The catch *f*, connected with the griping-plates through the plunger, and moving with the same, in combination with the case A, and the nut F having a notch, *d*, as and for the purpose described.

6. The hollow nut F having groove *c*, and exteriorly-threaded sleeve attached to and swiveling in the case A, in combination with the plunger B having catch *e*, for the purpose of permitting the device to be reset, substantially as described.

7. The plunger having catches *e* and *f*, in combination with the case A, and the swiveling-nut having notch *d* and groove *c*, as and for the purpose described.

F. J. FOX.

Witnesses:
H. McSWEENEY,
E. W. SNOOK.